United States Patent [19]

Willard

[11] Patent Number: 5,710,196
[45] Date of Patent: Jan. 20, 1998

[54] ASPHALT COMPOSITIONS CONTAINING ACRYLONITRILE-BUTADIENE-STYRENE COPOLYMER

[75] Inventor: G. Fred Willard, St. Charles, Mo.

[73] Assignee: General Electric Company, Pittsfield, Mass.

[21] Appl. No.: 703,625

[22] Filed: Aug. 27, 1996

[51] Int. Cl.$^6$ .................................................. C08L 95/00
[52] U.S. Cl. ........................................................... 524/68
[58] Field of Search ........................................... 524/68

[56] References Cited

U.S. PATENT DOCUMENTS

| | | | |
|---|---|---|---|
| H1250 | 11/1993 | Gilmore et al. | 529/68 |
| H1484 | 9/1995 | Collins | 524/68 |
| 3,785,852 | 1/1974 | Schleidt | 427/426 |
| 3,926,884 | 12/1975 | McColgan | 524/68 |
| 3,933,710 | 1/1976 | Fukushi et al. | 524/61 |
| 4,008,095 | 2/1977 | Fukushima et al. | 106/235 |
| 4,129,542 | 12/1978 | Matheson et al. | 524/70 |
| 4,273,685 | 6/1981 | Marzocchi et al. | 523/150 |
| 4,316,829 | 2/1982 | Roberts | 523/214 |
| 4,332,705 | 6/1982 | Uffner | 523/206 |
| 4,333,866 | 6/1982 | Uffner | 524/534 |
| 4,374,944 | 2/1983 | Ashburn et al. | 524/66 |
| 4,394,482 | 7/1983 | Uffner | 525/54.5 |
| 4,415,702 | 11/1983 | Ono et al. | 524/705 |
| 4,440,816 | 4/1984 | Uffner | 525/54.5 |
| 4,485,201 | 11/1984 | Davis | 524/68 |
| 4,511,679 | 4/1985 | Ariyoshi et al. | 521/83 |
| 4,547,399 | 10/1985 | Fujihara et al. | 427/138 |
| 4,738,997 | 4/1988 | Lundberg et al. | 524/68 |
| 4,772,647 | 9/1988 | Grossi et al. | 524/68 |
| 4,818,367 | 4/1989 | Winkler | 524/62 |
| 5,002,987 | 3/1991 | Schulz | 524/71 |
| 5,028,487 | 7/1991 | Kindt et al. | 428/489 |
| 5,039,342 | 8/1991 | Jelling | 106/273.1 |
| 5,070,123 | 12/1991 | Moran | 524/69 |
| 5,085,701 | 2/1992 | Müller et al. | 106/273.1 |
| 5,091,008 | 2/1992 | Lehmann et al. | 106/273.1 |
| 5,095,055 | 3/1992 | Moran | 524/68 |
| 5,115,983 | 5/1992 | Rutherford, Sr. | 241/1 |
| 5,252,641 | 10/1993 | Dawans | 524/68 |
| 5,290,833 | 3/1994 | Schmanski | 524/71 |
| 5,322,867 | 6/1994 | Kluttz | 524/68 |
| 5,378,079 | 1/1995 | Omann | 404/75 |
| 5,385,401 | 1/1995 | Nath | 366/7 |
| 5,393,811 | 2/1995 | Moran et al. | 524/71 |
| 5,393,819 | 2/1995 | Peters | 524/406 |
| 5,397,818 | 3/1995 | Flanigan | 524/68 |
| 5,399,598 | 3/1995 | Peters | 524/68 |
| 5,436,285 | 7/1995 | Causyn et al. | 524/68 |
| 5,446,097 | 8/1995 | Nonaka et al. | 525/193 |
| 5,456,751 | 10/1995 | Zandi et al. | 106/724 |
| 5,470,384 | 11/1995 | Cha et al. | 524/64 |
| 5,473,000 | 12/1995 | Pinomaa | 524/68 |
| 5,496,400 | 3/1996 | Doyle et al. | 106/220 |
| 5,501,730 | 3/1996 | Duong et al. | 106/281.1 |
| 5,506,283 | 4/1996 | McInnis et al. | 525/42.5 |
| 5,510,419 | 4/1996 | Burgoyne et al. | 525/98 |
| 5,525,653 | 6/1996 | Rouse | 524/71 |

OTHER PUBLICATIONS

TA Instruments, TA Instruments CSZ 100 Dynamic Shear Rheometer Expanded Benefits List.
TA Instruments CSA100 Asphalt Rheometer.
Superpave—The System, May 3, 1995, Presented by: Donald B. Siler, Presented at: The Asphalt Institute, Lexington, Kentucky.
Introduction To SHRP Asphalt Binder Test Methods and Specifications, prepared by National Asphalt Training Center.
TA Instruments, Rheology Applications Note.

*Primary Examiner*—Peter A. Szekely

[57] ABSTRACT

An improved asphalt composition is provided with the addition of a graft copolymer resin comprising a rubbery polymeric substrate and a rigid polymeric superstrate. A preferred graft copolymer resin is acrylonitrile-butadiene-styrene copolymer resin. Preferred compositions have increased temperature range performance and/or decreased penetration values as compared to the same compositions not containing the graft copolymer resins. The asphalt compositions may optionally contain a vulcanized rubber, preferably obtained from scrap tires.

24 Claims, No Drawings

ASPHALT COMPOSITIONS CONTAINING ACRYLONITRILE-BUTADIENE-STYRENE COPOLYMER

BACKGROUND OF THE INVENTION

1. Field of the Invention

This invention relates to asphalt compositions containing acrylonitrile-butadiene-styrene copolymers. The addition of acrylonitrile-butadiene-styrene copolymers to asphalt compositions resulted in an unexpected increase in high-low temperature grade ranges of the asphalt. Increasing the temperature grade ranges affords an asphalt that has a broadened temperature use range. Moreover, the addition of acrylonitrile-butadiene-styrene copolymers to asphalt compositions resulted in an unexpected decrease in penetration values for the compositions. The asphalt compositions may optionally contain a vulcanized rubber, preferably obtained from scrap conveyor belts or scrap tires.

2. Brief Description of the Related Art

Asphalt has been reported in U.S. Pat. No. 3,926,884 as an additive to acrylonitrile-butadiene-styrene copolymer resin with the limitation that amounts of asphalt in excess of about 2% results in loss of physical properties of the copolymer resin. Compositions of coal tar pitch and acrylonitrile-butadiene-styrene copolymer resin have also been reported as in U.S. Pat. No. 4,374,944.

Asphalt has been modified by the addition of elastomers to improve the flow characteristics and reduce the cracking of the asphalt, especially at low temperatures due to heavy loads. For example, U.S. Pat. Nos. 4,547,399, 4,835,199, 5,002,987, and H-1,250 relate to compositions of elastomeric copolymers and asphalt. Addition of elastomers presents difficulties at higher use temperatures as the asphalt becomes sticking and rutting occurs in the high traffic areas of the roadway.

Asphalt is frequently used as a roadway material due to its relatively material cost and ease of application. Continuous maintenance is however required to repair cracks and holes and the costs associated with maintaining asphalt roadways adds dramatically to the overall cost of the highway system. Improved grades are therefore in demand for improving the overall performance of asphalt compositions.

SUMMARY OF THE INVENTION

The long felt needs for an improved asphalt composition has been generally satisfied by the discovery of an improved composition comprising:

(i) an asphalt and (ii) a graft copolymer resin comprising a rubbery polymeric substrate and a rigid polymeric superstrate.

In a first preferred embodiment, the rubbery polymeric substrate of the graft copolymer resin is derived from at least one monomer of the group consisting of conjugated diene monomers, non-conjugated diene monomers, ($C_1$–$C_{12}$)alkyl acrylate monomers, ($C_2$–$C_8$)olefin monomers, and vinyl aromatic monomers; and the rigid polymeric superstrate is derived from at least one monomer of the group consisting of ($C_1$–$C_{12}$)alkyl (meth)acrylate monomers, vinyl aromatic monomers, and ethylenically unsaturated nitrile monomers.

In a second preferred embodiment, the graft copolymer resin comprises more than about 30% by weight rubbery polymeric substrate.

In a third preferred embodiment, the graft copolymer resin is derived from at least acrylonitrile, styrene, and butadiene monomers and comprises more than about 30% by weight rubbery polymeric substrate.

In a forth preferred embodiment, the graft copolymer resin is derived from at least acrylonitrile, styrene, and butadiene monomers, comprises more than about 30% by weight rubbery polymeric substrate, and comprises at least about 45% of the rigid polymeric superstrate grafted to the rubbery polymeric substrate.

DETAILED DESCRIPTION OF THE INVENTION

Asphalt is a bitumen which is available in many varieties depending upon its natural origins and on the industrial process used in its production. Chemically, bitumens, such as asphalt, are a mixture of aliphatic and aromatic (including naphthenic) hydrocarbons with high molecular weight and small quantities of organic acids, bases, and heterocyclic components containing nitrogen and sulfur. Asphalt is a colloidal substance, in which, the dispersed phase consisting of asphaltene, is covered by a protective phase of polar resins in complexes called micelles which are dispersed in a phase consisting of oils. The chemical nature of the various phases is not readily definable. Generally, however, the nucleus has characteristics that are more non- naphthenic aromatic than naphthenic aromatic hydrocarbons, the protective resins are prevalently naphthenic hydrocarbons and the oils that cover the micelles have a paraffinic character. The properties of bitumens, such as asphalt, are closely associated with the balance of the percentages of its components. Due to the difficulty of performing an exact chemical analysis, a classification is normally accepted which is based upon either viscosity at 60° C. or penetration level. Typical ASTM specifications for viscosity graded asphalts are shown in the table below.

| Test | AC-2.5 | AC-5 | AC-10 | AC-20 | AC-40 |
|---|---|---|---|---|---|
| viscosity, 60° C., Pa · s | 25 ± 5 | 50 ± 10 | 100 ± 20 | 200 ± 40 | 400 ± 80 |
| viscosity, 135° C., Pa · s | 80 | 110 | 150 | 210 | 300 |
| penetration of 100 g at 25° C. for 5 s, min, mm/10 | 200 | 120 | 70 | 40 | 20 |
| flash point, Cleveland open cup, min, °C. | 163 | 177 | 219 | 232 | 232 |

Due to its wide availability, relatively low price, and ease of application, asphalt has found widespread use as a road-building material, notwithstanding its visco-elastic behavior. The Strategic Highway Research Program (SHRP) has developed an asphalt specification system that utilizes certain physical property requirements that an asphalt must meet under the attendant climate and pavement temperatures that the asphalt is expected to be subjected. The SHRP specification utilizes an upper and lower temperature under which the asphalt must possess adequate physical properties. An example of a SHRP grade is "58-28." The first number, 58, indicates that the asphalt would possess adequate properties up to at least 58° C. The second number, -28, indicates that the asphalt would possess adequate physical properties at least down to −28° C. In selecting a proper grade for a particular application, not only must temperature be taken into account but also the load, number of load, and type of load must also be factored in. Increasing the spread between the upper and lower temperature grades affords an asphalt that is useful under a wider variety of conditions.

In order to at least partially overcome the intrinsic limitations in the use of asphalt as a road-building material, mineral aggregate is frequently added to asphalt to modify its rheology and temperature susceptibility. Asphalt can also be chemically modified to provide improved adhesion or compatibility to glass fibers, elastomeric, and resinous materials as described in U.S. Pat. Nos. 4,273,865 and 4,008,095. Asphalt compositions containing aggregate and chemically modified asphalt are within the scope of the present invention.

The present invention also contains a graft copolymer resin comprising a graft copolymer resin comprising a rubbery polymeric substrate and a rigid polymeric superstrate. In a preferred embodiment, the graft copolymer comprises more than 30% by weight rubbery polymeric substrate to rigid polymeric superstrate. The graft copolymer resin may also be used in combination with various block copolymer resins, such as, for example, polystyrene-polybutadiene diblock and triblock copolymer resins, polystyrene-poly(ethylene-butylene) diblock and triblock copolymer resins, and polystyrene-poly(ethylene-propylene) diblock and triblock copolymer resins, as well as mixtures of block copolymer resins.

The rubbery polymeric substrate generally comprises repeating units derived from one or more ethylenically unsaturated monomers selected from conjugated diene monomers, non-conjugated diene monomers, ($C_2$–$C_8$)olefin monomers, ($C_1$–$C_{12}$)alkyl acrylate monomers, ethylenically unsaturated nitrile monomers, and vinyl aromatic monomers. Useful ratios of the aforementioned monomers as well as other useful monomers and rubbery polymeric substrates will be apparent to those skilled in the art.

Suitable conjugated diene monomers include, for example, 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene, and dibromobutadiene as well as mixtures of diene monomers. In preferred embodiments, the conjugated diene monomer is 1,3-butadiene or mixtures of 1,3-butadiene with styrene monomer. Suitable non-conjugated diene monomers include, for example, ethylidene norbornene, dicyclopentadiene, hexadiene, and phenyl norbornene. Those skilled in the art can readily select other useful conjugated and non-conjugated diene monomers.

Useful $C_2$–$C_8$ olefin monomers include compounds having from 2 to about 8 carbon atoms per molecule and having a single site of ethylenic unsaturation per molecule. Suitable ($C_2$–$C_8$)olefin monomers include, for example, ethylene, propene, 1-butene, 1-pentene, heptene. Useful ($C_1$–$C_{12}$) alkyl acrylate monomers include acrylates having straight or branched alkyl substituent groups. The alkyl substituent groups generally have from 1 to about 12 carbon atoms per alkyl group and include, for example, methyl, ethyl, n-butyl, sec-butyl, t-butyl, n-propyl, iso-propyl, pentyl, hexyl, heptyl, octyl, nonyl, decyl, undecyl, and dodecyl. Illustrative examples of suitable ($C_1$–$C_{12}$)alkyl acrylates include butyl acrylate, iso-pentyl acrylate, n-hexyl acrylate, and 2-ethyl hexyl acrylate as well as mixtures of any of the foregoing and mixtures of any of the foregoing with other acrylates such as, for example, ethyl acrylate and methyl acrylate. The ethylenically unsaturated nitrile monomer includes acyclic compounds having a single nitrile group and a single site of ethylenic unsaturation per molecule and includes, for example, acrylonitrile and methacrylonitrile. Those skilled in the art can readily select other suitable ($C_2$–$C_8$)olefin, ($C_1$–$C_{12}$)alkyl acrylate, and ethylenically unsaturated nitrile monomers, as well as useful ratios of monomers.

Suitable vinyl aromatic monomers include, for example, styrene and substituted styrenes having one or more alkyl, alkoxyl, hydroxyl, or halo substituent groups attached to the aromatic ring, including, for example, α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene, and vinyl-substituted condensed aromatic ring structures, such as, for example, vinyl napthalene, vinyl anthracene; as well as mixtures of vinyl aromatic monomers. In a preferred embodiment, the vinyl aromatic monomer, when one is used, is styrene, α-methyl styrene, or mixtures of styrene and α-methyl styrene.

The rubbery polymeric substrate may, optionally, include a minor amount, for example, up to 5% by weight based on the weight of the monomers used for the rubbery substrate, of repeating units derived from a polyethylenically unsaturated crosslinking monomer, for example, butylene diacrylate, divinyl benzene, butene diol dimethacrylate, trimethylolpropane tri(meth)acrylate, allyl methacrylate, diallyl maleate, and triallyl cyanurate. Those skilled in the art will be able to select an appropriate polyethylenically unsaturated crosslinking monomer, when one is desired, as well as an appropriate amount of the monomer without undue experimentation.

In a first preferred embodiment, the substrate comprises repeating units derived from one or more conjugated diene monomers, such as, for example, a substantially homopolymeric polybutadiene rubber. In a second preferred embodiment, the substrate comprises repeating units derived from one or more conjugated diene monomers and one or more copolymerizable comonomers selected from vinyl aromatic monomers and ethylenically unsaturated nitrile monomers, such as, for example, styrene-butadiene copolymers, acrylonitrile-butadiene copolymers and styrene-butadiene-acrylonitrile copolymers. In a third preferred embodiment, the substrate comprises repeating units derived from one or more ($C_1$–$C_{12}$)alkyl acrylate monomers, more preferably from one or more monomers selected from butyl acrylate and n-hexyl acrylate including mixtures of one or both of the foregoing with other acrylates such as, for example, ethyl acrylate. In a fourth preferred embodiment, the substrate comprises units derived from one or more olefin monomers and includes, for example, ethylene/propylene copolymers, ethylene/propylene/non-conjugated diene monomer terpolymers.

Suitable rubbery polymeric substrates are made by known processes, for example, emulsion polymerization and mass polymerization. Generally, the rubbery polymeric substrate is made by aqueous emulsion polymerization in the presence of a free radical initiator, for example, an organic peroxide or persulfate initiator or a redox initiator system, and, optionally, in the presence of a chain transfer agent, for example, an alkyl mercaptan. The rubbery polymeric substrate may exhibit a unimodal particle size distribution or a multimodal distribution, such as a bimodal distribution.

The graft copolymer resin, in addition to comprising a rubbery polymeric substrate, also contains a rigid polymeric superstrate. The rigid polymeric superstrate includes repeating units derived monomers selected from the group consisting of ($C_1$–$C_{12}$)alkyl (meth)acrylate monomers, vinyl aromatic monomers and ethylenically unsaturated nitrile monomers. One skilled in the art can select an appropriate monomer or combination of monomers to afford a suitable rigid polymeric substrate. Suitable vinyl aromatic monomers and ethylenically unsaturated nitrile monomers are set forth above. As used herein the terminology alkyl (meth)acrylate monomers refers collectively to acrylate monomers and (meth)acrylate monomers. Suitable alkyl (meth)acrylate monomers include the acrylate monomers disclosed above and their (meth)acrylate analogs such as, for example, methyl (meth)acrylate, ethyl (meth)acrylate, propyl (meth)acrylate, isopropyl(meth)acrylate, butyl (meth)acrylate, hexyl(meth)acrylate, decyl (meth)acrylate, and the like.

In a preferred embodiment, the rigid polymeric superstrate comprises repeating units derived from one or more monomers selected from styrene, α-methyl styrene, and acrylonitrile. In a more preferred embodiment, the superstrate comprises from about 60% to about 90% by weight repeating units derived from styrene and from about 10% to about 40% by weight repeating units derived from acrylonitrile.

In an alternative preferred embodiment, the rigid polymeric superstrate comprises repeating units derived from one or more ($C_1$–$C_{12}$)alkyl (meth)acrylate monomers, and may, optionally, further comprise repeating units derived from one or more monomers selected from vinyl aromatic monomers and ethylenically unsaturated nitrile monomers. In another preferred embodiment, the rigid polymeric superstrate comprises greater than or equal to 50% by weight repeating units derived from one or more ($C_1$–$C_{12}$)alkyl (meth)acrylate monomers, more preferably from one or more monomers selected from methyl(meth)acrylate, ethyl (meth)acrylate, propyl (meth)acrylate, iso-propyl (meth)acrylate and butyl (meth)acrylate.

The rubbery substrate and the rigid superstrate may each independently optionally include minor amounts, for example, up to about 15% by weight of the total weight of the respective substrate or superstrate, of repeating units derived from one or more other copolymerizable ethylenically unsaturated monomers. Illustrative examples of suitable copolymerizable unsaturated monomers include ethylenically unsaturated carboxylic acids such as, for example, acrylic acid, methacrylic acid, itaconic acid; hydroxy ($C_1$–$C_{12}$)alkyl (meth)acrylate monomers such as, for example, hydroxyethyl (meth)acrylate; ($C_4$–$C_{12}$)cycloalkyl (meth)acrylate monomers such as for example, cyclohexyl methacrylate; (meth)acrylamide monomers such as, for example, acrylamide and (meth)acrylamide; vinyl esters such as, for example, vinyl acetate and vinyl propionate. The ($C_4$–$C_{12}$)cycloalkyl moiety above includes cyclic alkyl substituent groups having from about 4 to about 12 carbon atoms per group and the term (meth)acrylamide refers collectively to acrylamides and (meth)acrylamides. Those skilled in the art can readily select other suitable copolymerizable ethylenically unsaturated monomers based, in part, on specific requirements for a particular composition.

The rigid polymeric superstrate may, optionally, include a minor amount, for example, up to about 3% by weight, more preferably up to about 1.5% by weight, of repeating units derived from one or more polyethylenically crosslinking monomers. Suitable crosslinking monomers are disclosed above.

The graft copolymer is made according to known processes by polymerizing one or more monomers selected to provide a rigid polymeric superstrate in the presence of particles of the rubbery polymeric substrate under conditions such that at least a portion of the rigid polymeric superstrate is chemically grafted to the rubbery polymeric substrate by covalent bonds. In a preferred embodiment, the superstrate monomers are polymerized by an aqueous emulsion or aqueous suspension polymerization reaction in the presence of substrate particles and a polymerization initiator system, for example, a thermal or redox initiator system wherein a portion of the polymerizing chains of the superstrate monomers are chemically bonded or grafted to the substrate via reaction with unsaturated sites in the substrate. The unsaturated sites in the substrate are provided, for example, by residual unsaturated sites in repeating units derived from a conjugated diene or by residual unsaturated sites in repeating units derived from a graft linking monomer. In a preferred embodiment, the graft copolymer resin is a high rubber graft copolymer resin. By the term high rubber graft is meant that greater than about 30% by weight, preferably greater than about 45% by weight of the rigid polymeric superstrate is chemically grafted to the rubbery polymeric substrate.

In a first preferred embodiment, the substrate comprises repeating units derived from one or more conjugated diene monomers, and may, optionally, further comprise repeating units derived from one or more monomers selected from vinyl aromatic monomers and ethylenically unsaturated nitrile monomers, and the superstrate comprises repeating units derived from one or more monomers selected from butadiene, vinyl aromatic monomers and ethylenically unsaturated nitrile monomers. The preferred graft copolymer resins include, for example, acrylonitrile-butadiene-styrene resins commonly referred to as "ABS" resins.

Especially preferred are acrylonitrile-butadiene-styrene copolymers having greater than 30% by weight rubbery polymeric substrate, preferably greater than about 45% by weight rubbery polymeric substrate. The most preferred rubbery substrates comprise polybutadiene or styrene-butadiene copolymer. Also preferred are high rubber graft acrylonitrile-butadiene-styrene copolymers. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, GE Specialty Chemicals, Inc. under the trademark BLENDEX and include grades 131, 336, 338, 360, and 415.

In another preferred embodiment, the rubbery polymeric substrate comprises repeating units derived from one or more ($C_1$–$C_{12}$)alkyl acrylates and the superstrate comprises repeating units derived from one or more monomers selected from vinyl aromatic monomers and ethylenically unsaturated nitrile monomers, and include, for example, styrene-acrylate ("SA") high rubber graft copolymers and acrylonitrile-styrene-acrylate ("ASA") high rubber graft copolymers. Suitable ASA-type graft copolymers are commercially available from, for example, GE Specialty Chemicals, Inc. under the trademark BLENDEX and include grade 975, 977, and 980.

In a third preferred embodiment, the substrate comprises repeating units derived from one or more conjugated diene monomers and may, optionally, further comprise repeating units derived from one or more monomers selected from ($C_1$–$C_{12}$)alkyl acrylate monomers, vinyl aromatic monomers and ethylenically unsaturated nitrile monomers, and the superstrate comprises repeating units derived from one or more ($C_1$–$C_{12}$)alkyl acrylate monomers and may, optionally, further comprise repeating units derived from one or more monomers selected from vinyl aromatic monomers and ethylenically unsaturated nitrile monomers, such as, for example, methyl (meth)acrylate-acrylonitrile-butadiene-styrene ("MABS") high rubber graft copolymers, (meth)acrylate-butadiene-styrene ("MBS") high rubber graft copolymers. Suitable MBS-type graft copolymers are commercially available from Rohm and Haas Company under the trademark PARALOID and include grades BTA- 733 and BTA-753 and from Kaneka Texas under the trademark KANE ACE and include grade B-56.

In a third preferred embodiment, the substrate comprises repeating units derived from one or more conjugated diene monomers and may, optionally, further comprise repeating units derived from one or more monomers selected from ($C_1$–$C_{12}$)alkyl (meth)acrylate monomers, vinyl aromatic monomers and ethylenically unsaturated nitrile monomers, and the superstrate comprises repeating units derived from one or more ($C_1$–$C_{12}$)alkyl (meth)acrylate monomers and may, optionally, further comprise repeating units derived from one or more monomers selected from vinyl aromatic monomers and ethylenically unsaturated nitrile monomers, such as, for example, methyl (meth)acrylate-acrylonitrile-butadiene-styrene ("MABS") high rubber graft copolymers, (meth)acrylate-butadiene-styrene ("MBS") high rubber graft copolymers. Suitable MBS-type graft copolymers are commercially available from Rohm and Haas Company under the trademark PARALOID and include grades BTA-733 and BTA-753 and from Kaneka Texas under the trademark KANE ACE and include grade B-56.

In another preferred embodiment, the superstrate comprises repeating units derived from one or more olefin monomers and may, optionally, further comprise repeating units derived from one or more non-conjugated diene monomers, and the superstrate comprises repeating units derived from one or more monomer selected from vinyl aromatic monomers and ethylenically unsaturated nitrile monomers, and include, for example, acrylonitrile-ethylene-propylene-styrene ("AES") high rubber graft copolymers.

In another preferred embodiment, the substrate comprises repeating units derived from one or more ($C_1$–$C_{12}$)alkyl acrylate monomer and the superstrate comprises repeating units derived from one or more ($C_1$–$C_{12}$)alkyl (meth) acrylate monomer, and include, for example, acrylic core-shell graft copolymers. Also included with the acrylic core-shell graft copolymers are butadiene modified acrylic copolymers. Suitable acrylic-type graft copolymers are commercially available from Rohm and Haas Company under the trademark PARALOID and include grades KM 334 and KM 355 and from Elf Atochem as grade Dura-strength 200.

The amount of graft copolymer resin in the present invention can vary widely depending, in part on the properties desired in the asphalt composition. The amount of graft copolymer resin contained in the asphalt compositions is generally between about 0.1% by weight to about 25% by weight based upon the weight of asphalt. A more preferred ranged if from about 0.2% by weight to about 15% by weight, a most preferably between about 0.5% by weight and about 10% by weight, wherein all weights are based upon the amount of asphalt contained in the composition.

The asphalt compositions may further comprise at least one additional component of aggregate, vulcanized rubber, fiber reinforcement, block copolymer resin, and oil. The vulcanized rubber component used is generally derived primarily from vulcanates of polybutadiene rubber, styrene-butadiene rubber, butyl rubber, ethylene-propylene-diene rubber, cis-1,4-polyisoprene rubber-either synthetic or natural in origin, and mixtures of the foregoing rubbers. The vulcanized rubber is preferably obtained as a recycled material and is primarily obtained from tires used for automobiles and the like. These tires are generally a composite containing several components such as the aforementioned rubbers; processing aids such as petroleum oils that act as plasticizers or softeners; accelerators such as xanthates like dibutylxanthogen disulfide; crosslinking materials such as sulfur; fillers such as carbon black; and cords such as steel wire coated with brass.

The rubber that originates from a scrap or used tire is preferably processed prior to utilization for the present invention. The tire tread, or rubber portion, is preferably removed from any cords present in the tire structure. The rubber can be subjected to further processing to remove hydrophilic and hydrophobic contaminants in the recycled tire or introduced during a grinding process. Solvents such as water, carbon tetrachloride, and other commonly used industrial solvents, and combinations thereof can be used to wash the tire rubber material. The rubber has typically been shredded or ground, preferably finely ground.

The amount of vulcanized rubber added to the asphalt can vary widely and is preferably between 0% and about 35% by weight vulcanized rubber to asphalt. An especially preferred amount ranges up to about 25% by weight of vulcanized rubber to asphalt.

The vulcanized rubber may be treated with an aromatic oil or other light oil prior incorporation into the asphalt as described in U.S. Pat. No. 5,385,401. Sufficient oil may be added to substantially saturate the rubber particles with oil in order to reduce absorption of oils from asphalt into the rubber when the rubber is added to the asphalt mixture. When an oil is utilized, the amount should be sufficient to prevent the rubber from removing oils from the asphalt during subsequent steps of heating and mixing. Generally the weight ratio of oil to rubber may be in the order of 40 to 60% of oil combined with the rubber. The aforementioned amounts of vulcanized rubber are to be construed as before the addition of any added oil.

It should be clear that the present invention affords asphalt compositions containing a graft copolymer wherein the asphalt compositions have decreased penetration values than the same asphalt compositions not containing the graft copolymer resin. The asphalt compositions preferably have at least about a 15% decrease in penetration value when the graft copolymer is present.

It should also be understood that the present invention also affords an unexpected method for altering, either decreasing or increasing, the viscosity of asphalt compositions by admixing a graft copolymer resin comprising a rubbery polymeric substrate and a rigid polymeric superstrate with the asphalt composition. The method affords a wide variety of asphalt viscosities depending on the asphalt starting viscosity and the graft copolymer resin utilized. It should also be clear that the present method affords asphalt compositions preferably have at least about a 15% decrease in penetration value as compared to the same asphalt composition not containing the graft copolymer resin. One of ordinary skill in the art will be able to select an appropriate asphalt grade and graft copolymer resin to achieve the affect desired.

The method of preparing asphalt compositions may further comprise admixing at least one additional component of aggregate, vulcanized rubber, fiber reinforcement, block copolymer resin, and oil.

The compositions of the present invention can be prepared by known techniques in the art for mixing asphalt compositions. These techniques include both low and high shear mixing techniques, preferably accomplished at elevated temperatures. The graft copolymer resin may be added to the asphalt composition as a dry material, as a latex, or as a suspension in water or other liquid. It was unexpectedly found that low shear mixing is effective for preparing the compositions of the present invention. This result is unexpected since the styrene-butadiene-styrene block copolymers of the prior art require high shear mixing in order to obtain the desired physical properties. Low shear mixing offers numerous and significant commercial advantages as simple recirculating tanks can provide sufficient mixing. One of skill in the art will be able to envision appropriate low and high shear conditions for admixing the present compositions.

All patents cited by reference are incorporated herein by reference.

In order that those skilled in the art will be better able to practice the invention, the following examples are given by way of illustration and not by way of limitation.

EXAMPLES

The illustrative compositions were prepared by mixing all the ingredients in a high shear mixer for about 20 minutes at 350° F. followed by physical property testing. A Brookfield viscometer was used to determine viscosities at 140° F. Penetration was measured using a Precision penetrometer at 75° F. with a 5 grams weight and a 5 second penetration duration. All parts of parts by weight.

AC-5 is a commercially available asphalt meeting the ASTM specification ratings.

AC-20 is a commercially available asphalt meeting the ASTM specification ratings.

GRT is ground vulcanized rubber from rubber tires obtained from Sparton Industries.

D-1101G is a polystyrene-polybutadiene-polystyrene block copolymer obtained from Shell Chemical company under the trademark KRATON as grade D-1101G.

ABS-1 is a commercially available acrylonitrile-butadiene-styrene copolymer resin comprising about 30% by weight of a polybutadiene rubbery polymeric substrate and about 70% by weight of a styrene-acrylonitrile copolymer rigid polymeric superstrate having a styrene to acrylonitrile weight ratio of about 1.85:1 and having about 45% of the styrene-acrylonitrile copolymer free (i.e., non-grafted).

ABS-2 is a commercially available acrylonitrile-butadiene-styrene copolymer resin comprising about 65% by weight of a poly(butadiene-styrene) copolymer rubbery polymeric substrate having about a 1:3 weight ratio of styrene to butadiene and about 35% by weight of a styrene-acrylonitrile copolymer rigid polymeric superstrate having a styrene to acrylonitrile weight ratio of about 1.85:1 and having less than about 10% of the styrene-acrylonitrile copolymer free (i.e., non-grafted). The rubbery polymeric substrate had a number average molecular weight, relative to polystyrene standards, of between about 13,000 and about 17,000 and the rigid polymeric superstrate had a number average molecular weight, relative to polystyrene standards, of between about 13,000 and about 15,000.

ABS-3 is a commercially available acrylonitrile-butadiene-styrene copolymer resin comprising about 70% by weight of a polybutadiene rubbery polymeric substrate and about 30% by weight of a styrene-acrylonitrile copolymer rigid polymeric superstrate having a styrene to acrylonitrile weight ratio of about 3:1 and having less than about 10% of the styrene-acrylonitrile copolymer free (i.e., non-grafted). The rubbery polymeric substrate had a number average molecular weight, relative to polystyrene standards, of between about 16,000 and about 22,000 and the rigid polymeric superstrate had a number average molecular weight, relative to polystyrene standards, of between about 12,000 and about 33,000.

ABS-4 is a commercially available acrylonitrile-butadiene-styrene copolymer resin comprising about 50% by weight of a polybutadiene rubbery polymeric substrate and about 50% by weight of a styrene-acrylonitrile copolymer rigid polymeric superstrate having a styrene to acrylonitrile weight ratio of about 3:1 and having less than about 25% of the styrene-acrylonitrile copolymer free (i.e., non-grafted).

TABLE 1

|  | 1 | 2 | 3 | 4 | 5 | 6 |
|---|---|---|---|---|---|---|
| Ingredients: |  |  |  |  |  |  |
| AC-5 | 100 | 100 | 100 | 100 | 100 | 100 |
| D-1101G | 0 | 3 | 0 | 0 | 0 | 0 |
| ABS-1 | 0 | 0 | 3 | 0 | 0 | 0 |
| ABS-2 | 0 | 0 | 0 | 3 | 0 | 0 |
| ABS-3 | 0 | 0 | 0 | 0 | 3 | 0 |
| ABS-4 | 0 | 0 | 0 | 0 | 0 | 3 |
| Properties: |  |  |  |  |  |  |
| penetration, dmm | 120 | 53 | 99 | 93 | 75 | 93 |
| Viscosity (centipoise) | 150 | 900 | 110 | 100 | 150 | 125 |

Table 1 contains illustrative examples of asphalt compositions comprising graft copolymer resin comprising a rubbery polymeric substrate and a rigid polymeric superstrate. Example 1 is a control of a commercially available asphalt. Example 2 is a control of the prior art illustrating the use of a block copolymer added to asphalt. As seen by these data, addition of the block copolymer improves (i.e., decreases) the penetration value but at the expense of the viscosity of the asphalt. Examples 3 to 6 demonstrate asphalt compositions containing graft copolymer resins derived from acrylonitrile, styrene, and butadiene monomers. As seen by these data, all of these examples unexpectedly resulted in a decrease in the penetration values. Even more surprisingly, the viscosity values did not increase as compared to the control asphalt. As seen by the example of the prior art (example 2), one would have expected the viscosity to increase as with the block copolymer resin. The results obtained for example 5 are especially unexpected as this composition matched the viscosity of the control asphalt yet still reduced the penetration value by more than 35%.

TABLE 2

|  | 7 | 8 | 9 | 10 | 11 | 12 |
|---|---|---|---|---|---|---|
| Ingredients: |  |  |  |  |  |  |
| AC-20 | 100 | 100 | 100 | 100 | 100 | 100 |
| D-1101G | 0 | 3 | 0 | 0 | 0 | 0 |
| ABS-1 | 0 | 0 | 3 | 0 | 0 | 0 |
| ABS-2 | 0 | 0 | 0 | 3 | 0 | 0 |
| ABS-3 | 0 | 0 | 0 | 0 | 3 | 0 |
| ABS-4 | 0 | 0 | 0 | 0 | 0 | 3 |
| Properties: |  |  |  |  |  |  |
| penetration, dmm | 65 | 39 | 47 | 48 | 55 | 48 |
| Viscosity (centipoise) | 50 | 100 | 150 | 100 | 150 | 75 |

The compositions in Table 2 are similar to those in found in Table 1 but are made with a different viscosity grade of asphalt. As noted with the compositions in Table 1, the penetration values decreased with the addition of the graft copolymer resin comprising a rubbery polymeric substrate and a rigid polymeric superstrate. As seen by these data, the viscosity values can unexpectedly be altered by changing the graft copolymer resin comprising a rubbery polymeric substrate and a rigid polymeric superstrate. It should be clear from the data contained within Tables 1 and 2 that by blending graft copolymer resins and viscosity grades of asphalt that a wide range of final asphalt compositions could be developed varying in properties such as penetration values and viscosity.

TABLE 3

|  | 13 | 14 | 15 | 16 | 17 | 18 | 19 |
|---|---|---|---|---|---|---|---|
| Ingredients: | | | | | | | |
| AC-5 | 100 | 80 | 80 | 80 | 80 | 80 | 80 |
| GRT | 0 | 20 | 20 | 20 | 20 | 20 | 20 |
| D-1101G | 0 | 0 | 1 | 0 | 0 | 0 | 0 |
| ABS-1 | 0 | 0 | 0 | 1 | 0 | 0 | 0 |
| ABS-2 | 0 | 0 | 0 | 0 | 1 | 0 | 0 |
| ABS-3 | 0 | 0 | 0 | 0 | 0 | 1 | 0 |
| ABS-4 | 0 | 0 | 0 | 0 | 0 | 0 | 1 |
| Properties: | | | | | | | |
| penetration, dmm | 120 | 42 | 42 | 58 | 43 | 43 | 38 |
| Viscosity (centipoise) | 150 | 2200 | 1600 | 300 | 14,000 | 25,600 | 46,000 |

Sample 13 demonstrates the properties of a commercially available AC-5 grade asphalt. Sample 14 illustrates the properties obtained after the addition of 20 parts of a ground rubber tire, a vulcanized rubber, to the AC-5 grade asphalt. As noted by comparing sample 13 to sample 14, addition of the ground rubber to the asphalt led to an increase in the viscosity and a decrease in the penetration value. Sample 15 illustrates the properties obtained with the addition of a polystyrene-polybutadiene-polystyrene triblock copolymer to the ground rubber tire/asphalt composition. Comparison of the properties obtained for sample 15 to those obtained for sample 14 illustrates a decrease in viscosity with the addition of the triblock copolymer to the ground rubber tire/asphalt composition.

Samples 15 to 19 illustrate the properties obtained with the addition of acrylonitrile-butadiene-styrene copolymer resin to the ground rubber tire/asphalt composition. Comparison of the properties obtained for sample 16 to either sample 14, containing the ground rubber tire added to the asphalt, or sample 15 containing the triblock copolymer added to the ground rubber tire/asphalt composition, illustrates the unexpected changes in properties with the addition of acrylonitrile-butadiene-styrene copolymer resin. Further comparison of the property data obtained for samples 17, 18, and 19 to samples 15 and 16 illustrates the unexpected changes in properties obtained with the addition of different acrylonitrile-butadiene-styrene copolymer resins having a rubbery polymeric content greater than 30%. Sample 19, containing a high rubber graft acrylonitrile-butadiene-styrene copolymer resin having about 50% rubbery polymeric phase unexpectedly demonstrated the lowest penetration value and the highest viscosity, two very desirable properties. It is believed that viscosity is directly related to the compatibility of the ground tire/asphalt composition with a higher viscosity indicative of greater compatibility. It is unexpected that sample 19 would have the highest viscosity as one would expect samples 17 and 18 to have higher viscosities due to their higher rubber contents and greater potential to swell in the asphalt composition. Moreover, reduction in the penetration value is desirable as this property is believed to be directly related to the impact durability of the asphalt.

TABLE 4

|  | 20 | 21 | 22 |
|---|---|---|---|
| Ingredients: | | | |
| AC-5 | 100 | 96 | 96 |
| ABS-3 | 0 | 4 | 0 |
| ABS-4 | 0 | 0 | 4 |
| Properties: | | | |
| SHRP grade | 60–30 | 65–30 | 67–29 |
| ΔT, °C. | 90 | 95 | 96 |

As seen by the data in Table 4, the addition of the graft copolymer resin unexpectedly affords a large increase in the temperature range of the asphalt compositions. For example, comparison of control sample 20 to sample 21 that contains only 4 parts of a graft copolymer resin had an increase in the upper temperature rating from 60° to 65° C. with no change in the lower temperature rating of −30° C. Thus, as compared to Sample 20, Sample 21 containing the graft copolymer resin had an unexpected increase in the temperature range performance from 90° C. to 95° C. Sample 22 further demonstrates a similar improvement in the temperature range with the addition of a graft copolymer resin.

TABLE 5

|  | 23 | 24 | 25 | 26 | 27 |
|---|---|---|---|---|---|
| Ingredients: | | | | | |
| AC-5 | 100 | 98 | 98 | 98 | 98 |
| ABS-3 | 0 | 2 | 2 | 0 | 0 |
| ABS-4 | 0 | 0 | 0 | 2 | 2 |
| Shear | — | low | high | low | high |
| Properties: | | | | | |
| SHRP grade | 60–30 | 68–31 | 62–32 | 62–32 | 60–31 |
| ΔT, °C. | 90 | 99 | 94 | 93 | 91 |

The data in Table 5 illustrate that both high and low shear mixing conditions may be utilized to prepare the compositions of the present invention. These data are unexpected as asphalt compositions containing polystyrene-polybutadiene block copolymers require high shear mixing in order to obtain enhanced properties.

It should be clear from the data in Tables 1 to 5 that a wide variety of penetration values, viscosities, and temperature use ranges can be obtained with compositions made from asphalt and graft copolymer resin comprising a rubbery polymeric substrate and a rigid polymeric superstrate. It should also be clear that the present invention includes a method to adjust the penetration and/or viscosity values of asphalt compositions by admixing at least one of the aforementioned graft copolymer resins with the asphalt composition.

What is claimed:

1. An asphalt composition comprising:
   a) an asphalt;
   b) a graft copolymer resin comprising a rubbery polymeric substrate and a rigid polymeric superstrate; and
   c) at least one additional component selected from the group consisting of aggregate, vulcanized rubber, reinforcing fiber, block copolymer resin, and oil.

2. The asphalt composition of claim 1, wherein the rubbery polymeric substrate of the graft copolymer resin is derived from at least one monomer of the group consisting of conjugated diene monomers, non-conjugated diene monomers, ($C_1$–$C_{12}$)alkyl acrylate monomers, ($C_2$–$C_8$) olefin monomers, and vinyl aromatic monomers; and the rigid polymeric superstrate is derived from at least one monomer of the group consisting of ($C_1$–$C_{12}$)alkyl (meth) acrylate monomers, vinyl aromatic monomers, and ethylenically unsaturated nitrile monomers.

3. The composition of claim 1, wherein said graft copolymer resin is at least one resin selected from the group consisting of acrylonitrile-butadiene-styrene resins, acrylonitrile-ethylene-propylene-styrene copolymer resins, acrylic graft copolymer resins, methyl methacrylate-acrylonitrile-butadiene-styrene copolymer resins, methacrylate-butadiene-styrene copolymer resins, styrene-acrylate copolymer resins, and acrylonitrile-styrene-acrylate copolymer resins.

4. The composition of claim 1, wherein said graft copolymer resin is an acrylonitrile-butadiene-styrene resin.

5. The composition of claim 1, wherein said graft copolymer resin is an acrylonitrile-ethylene-propylene-styrene copolymer.

6. The composition of claim 1, wherein said graft copolymer resin is an acrylic graft copolymer resin.

7. The composition of claim 1, wherein said graft copolymer resin is a methyl methacrylate-acrylonitrile-butadiene-styrene.

8. The composition of claim 1, wherein said graft copolymer resin is a methacrylate-butadiene-styrene copolymer resin.

9. The composition of claim 1, wherein said graft copolymer resin is a styrene-acrylate copolymer resin.

10. The composition of claim 1, wherein said graft copolymer resin is an acrylonitrile-styrene-acrylate copolymer resin.

11. The asphalt composition of claim 1, wherein the graft copolymer resin comprises more than about 30% by weight rubbery polymeric substrate.

12. The asphalt composition of claim 2, wherein the graft copolymer resin is derived from at least acrylonitrile, styrene, and butadiene monomers.

13. The asphalt composition of claim 2, wherein the graft copolymer resin comprises at least about 30% of the rigid polymeric superstrate grafted to the rubbery polymeric substrate.

14. The asphalt composition of claim 13, wherein the graft copolymer resin comprises at least about 45% of the rigid polymeric superstrate grafted to the rubbery polymeric substrate.

15. The asphalt composition of claim 1, wherein the graft copolymer resin is present in an amount sufficient to adjust the viscosity of the asphalt composition as compared to the same asphalt composition not containing the graft copolymer resin.

16. The asphalt composition of claim 1, wherein the graft copolymer resin is present in an amount sufficient to decrease the penetration of the asphalt composition as compared to the same asphalt composition not containing the graft copolymer resin.

17. The asphalt composition of claim 1, wherein the additional component is vulcanized rubber.

18. An asphalt composition consisting essentially of:
a) an asphalt;
b) a graft copolymer resin comprising a rubbery polymeric substrate and a rigid polymeric superstrate; and
c) at least one additional component selected from the group consisting of aggregate, vulcanized rubber, reinforcing fiber, block copolymer resin, and oil.

19. A method of increasing the viscosity of an asphalt composition wherein the asphalt composition is admixed with a graft copolymer resin comprising a rubbery polymeric substrate and a rigid polymeric superstrate;
wherein the asphalt composition further comprises at least one additional component selected from the group consisting of aggregate, vulcanized rubber, reinforcing fiber, block copolymer resin, and oil.

20. The method of claim 19, wherein the graft copolymer resin is at least one resin selected from the group consisting of acrylonitrile-butadiene-styrene resins, acrylonitrile-ethylene-propylene-styrene copolymer resins, acrylic graft copolymer resins, methyl methacrylate-acrylonitrile-butadiene-styrene copolymer resins, methacrylate-butadiene-styrene copolymer resins, styrene-acrylate copolymer resins, and acrylonitrile-styrene-acrylate copolymer resins.

21. The method of claim 19, wherein the asphalt composition admixed with the graft copolymer resin has a penetration value less than the penetration value of the same composition not containing the graft copolymer resin.

22. The method of claim 19, wherein the graft copolymer resin is derived from at least acrylonitrile, styrene, and butadiene monomers.

23. A method of increasing the temperature range performance of an asphalt composition wherein the asphalt composition is admixed with a graft copolymer resin comprising a rubbery polymeric substrate and a rigid polymeric superstrate;
wherein the asphalt composition further comprises at least one additional component of aggregate, vulcanized rubber, reinforcing fiber, block copolymer resin, and oil.

24. The method of claim 23, wherein the graft copolymer resin is at least one resin selected from the group consisting of acrylonitrile-butadiene-styrene resins, acrylonitrile-ethylene-propylene-styrene copolymer resins, acrylic graft copolymer resins, methyl methacrylate-acrylonitrile-butadiene-styrene copolymer resins, methacrylate-butadiene-styrene copolymer resins, styrene-acrylate copolymer resins, and acrylonitrile-styrene-acrylate copolymer resins.

* * * * *